G. W. RUE.
Potato-Diggers.

No. 155,622.  Patented Oct. 6, 1874.

Witnesses:
John M. Davidson
Ahram Miller

Inventor:
George W. Rue
by his atty.
C. M. Peck

UNITED STATES PATENT OFFICE.

GEORGE W. RUE, OF HAMILTON, OHIO.

IMPROVEMENT IN POTATO-DIGGERS.

Specification forming part of Letters Patent No. 155,622, dated October 6, 1874; application filed May 16, 1874.

*To all whom it may concern:*

Be it known that I, GEORGE W. RUE, of Hamilton, in the county of Butler and State of Ohio, have invented a new and useful Improvement in Implements for Digging Potatoes; and I do hereby declare that the following is a full and exact description of the same, reference being had to the accompanying drawings, and to the letters of reference marked thereon.

Figure 1:
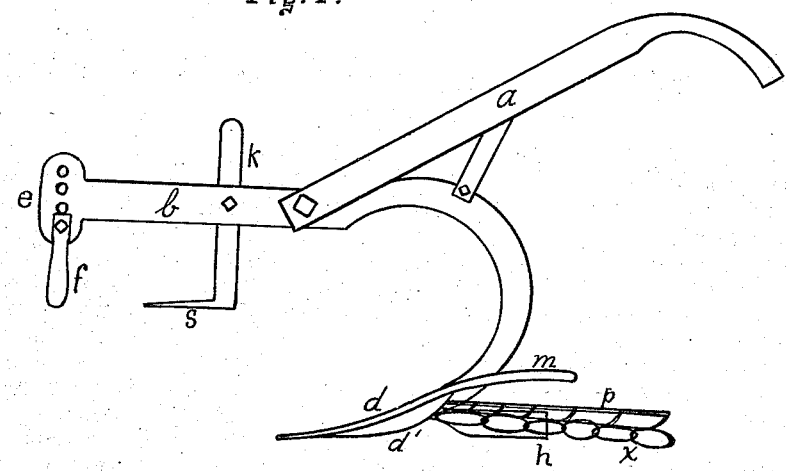
Figure 2:
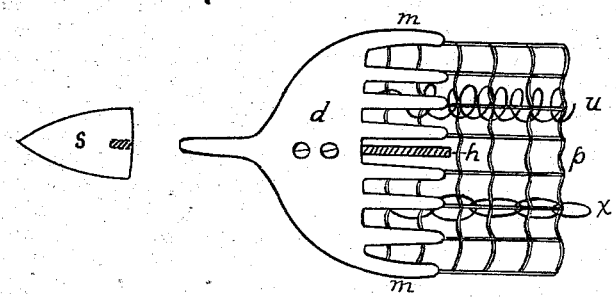

Figure 1 represents a side elevation of my improved potato-digger. Fig. 2 represents the operating parts of the same, the framework being broken away.

My invention relates to the combination of certain devices with a slotted shovel for digging potatoes, by means of which the soil will be agitated and sifted, and the potatoes brought to the surface of the ground. The implement will be guided so as to work with steadiness, as herein more fully set forth. My improved potato-digger is propelled like a plow. It is provided with a vine-gatherer, which is placed in advance of the digger.

In the accompanying drawings, $a$ represents one of the handles; $b$, the beam, provided with a head, $e$, and clevis $f$. The beam is curved in the rear to form a standard, to which is bolted the shovel $d$, having an inclined position, and of a width a little greater than an ordinary row of potatoes, and it is provided with a nose, and terminates in arms or prongs $m$ $m$. To the under side of this shovel is hinged a corrugated sifter or screen, $p$, which is of the same width as the shovel, but extends rearward beyond the arms or prongs $m$, in order to receive the falling earth and potatoes and separate them, leaving the potatoes exposed on the ground. This screen is free to move up and down to a certain extent, and is oscillated by the action of the chains or spirals $x$ and $u$, on which it is carried. These chains or spirals are fastened to the under side of the shovel, and assist in bringing the potatoes to the surface of the ground. There is bolted to the standard, under the screen, a keel, $h$, which projects beyond the prongs $m$, and serves to steady the motion of the shovel, and prevent it from deviating from a true line. To the beam $b$ is bolted an arm, $k$, having a smaller shovel or share, $s$, at its lower extremity, the purpose of which is to gather the vines and all light obstacles upon the surface of the hill in advance of shovel $d$. The upper surface of shovel $d$ is concave, and the shield $d'$ underneath is convex, and there is an open space between them, in which the separating devices are hinged, which provision allows the irregular movements of the chains or spirals, which drag upon the ground beneath the screen to agitate it constantly.

I would here call attention to the particular functions of the shield $d'$ and the heel or keel $h$. The former serves two objects, and is indispensable, for it secures freedom of motion to the hinged devices fastened to the standard above it, preventing the obstruction which would be offered by the projection of the bolts and other fastening devices. It also secures a steadiness of motion to the implement, and prevents its sinking too deeply in a friable soil. The keel $h$ serves as a guide to the plow, and prevents its deviation from a straight line, as before stated. These are especial features of my invention.

The chains or spirals may be employed in any desirable number, or other equivalently operating devices may be used in their stead.

The operation of my improved digger may be described as follows: As the shovel progresses the earth with the potatoes is elevated, and what does not fall through the slots of the shovel upon the screen will pass to the rear and fall upon it, and be finally discharged behind the machine. The efficiency of the agitating devices will cause the potatoes to be left upon the surface of the ground.

What I claim, and desire to secure by Letters Patent, is—

The shield $d'$, in combination with the slotted shovel $d$, the screen $p$, and agitating devices, hinged in the open space above the shield, for the purpose and substantially as described.

Witness my hand this 11th day of May, A. D. 1874.

GEO. W. RUE.

Witnesses:
 JOHN M. DAVIDSON,
 ROBERT BECKETT.